F. & W. G. TYSON.
THERMOSTATIC HEAT CONTROLLING DEVICE.
APPLICATION FILED FEB. 25, 1909.
1,131,444.
Patented Mar. 9, 1915.
3 SHEETS—SHEET 2.
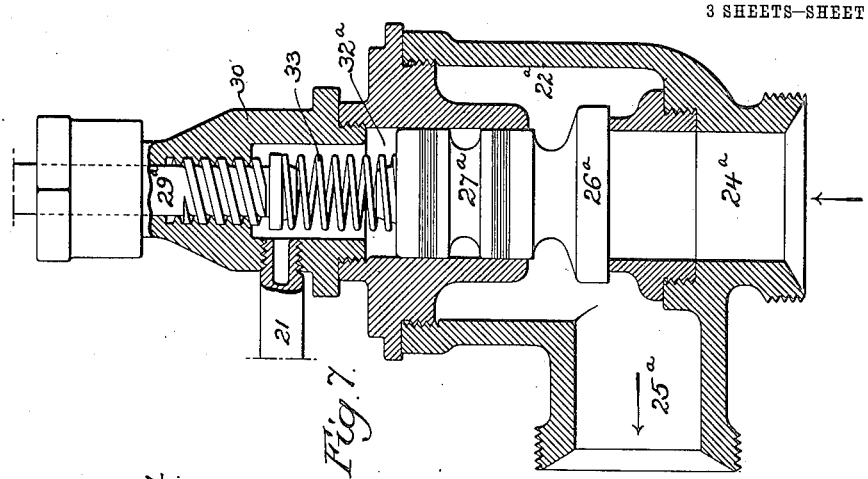
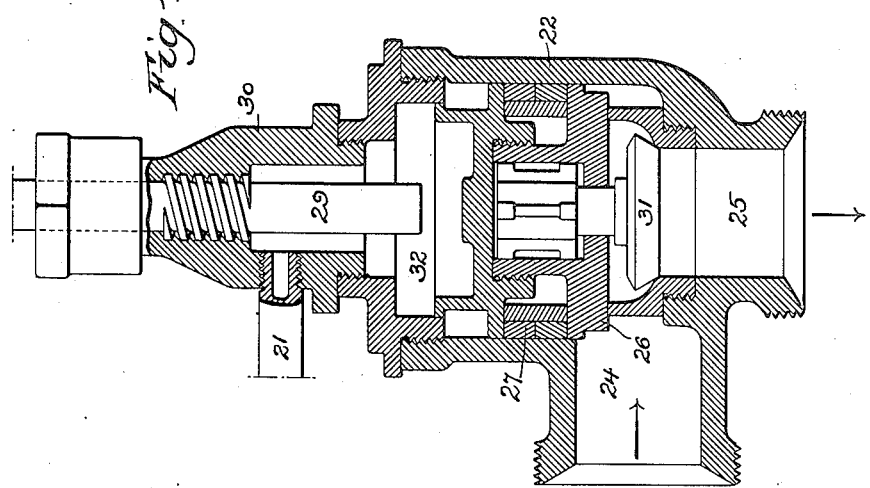
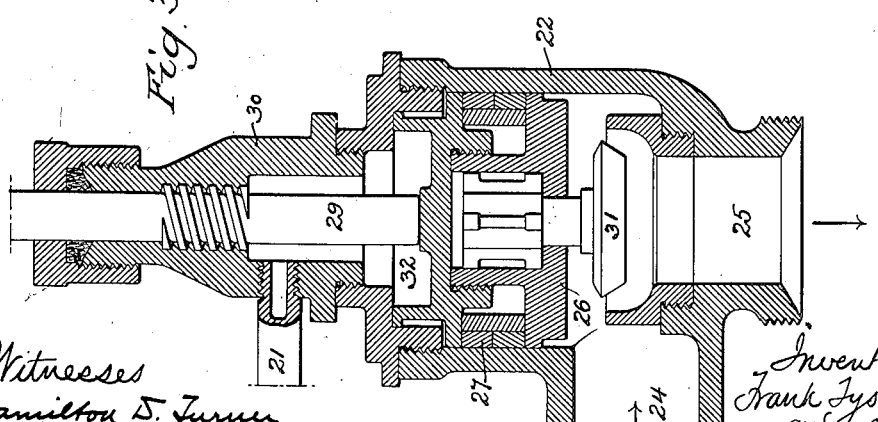
Witnesses
Hamilton S. Turner
Harry L. Smith
Inventors
Frank Tyson
and
William G. Tyson
by their Attorneys
Smith Rogers

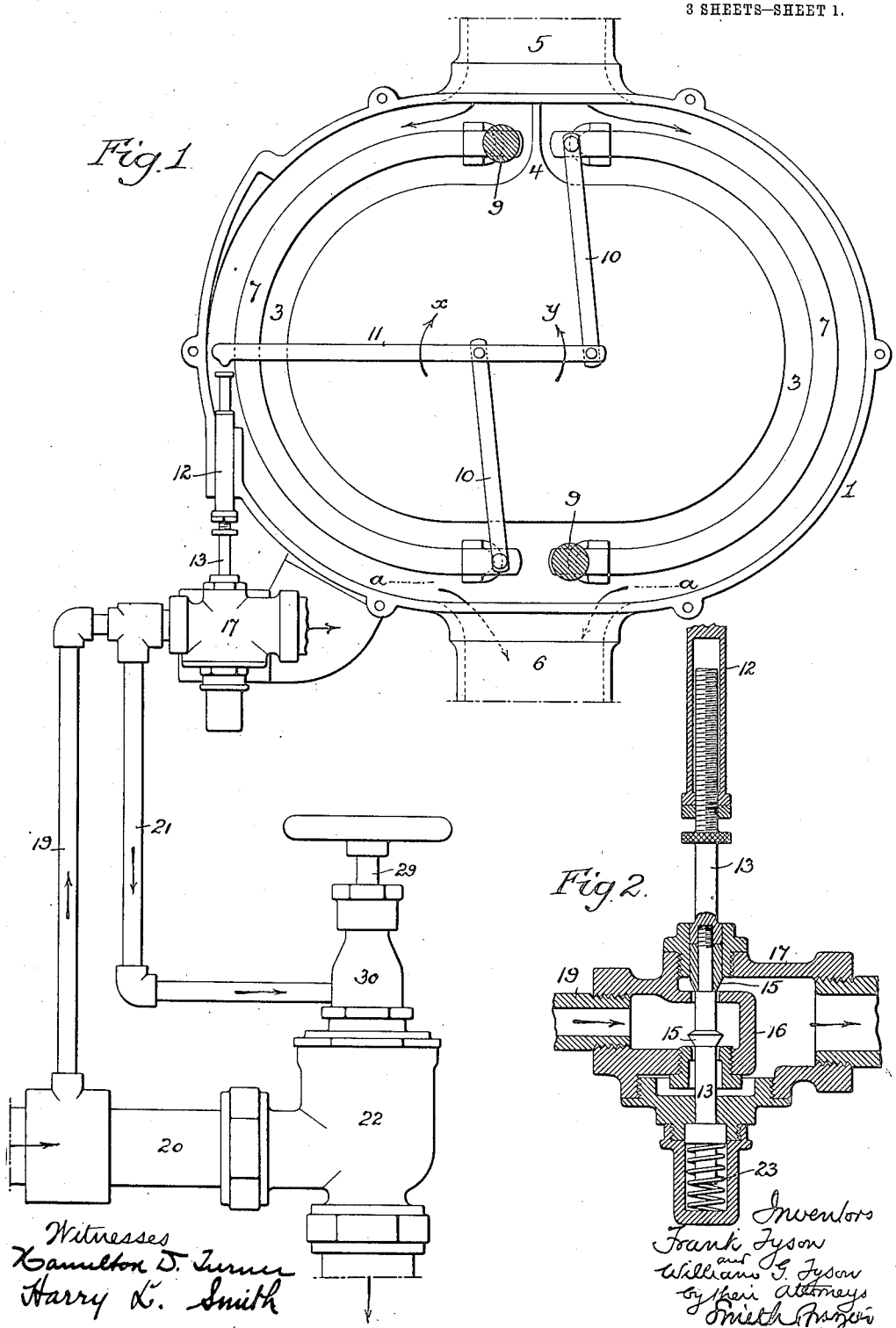

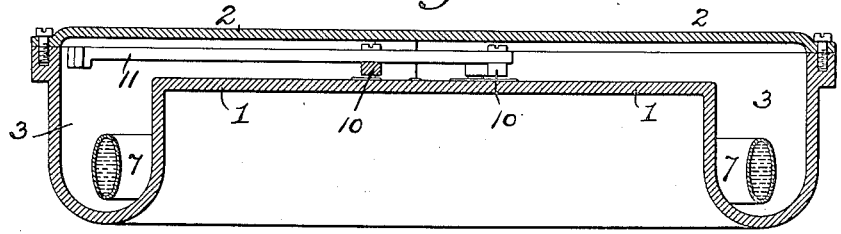
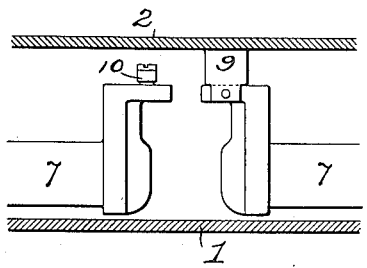

UNITED STATES PATENT OFFICE.

FRANK TYSON AND WILLIAM G. TYSON, OF CANTON, OHIO.

THERMOSTATIC HEAT-CONTROLLING DEVICE.

1,131,444.   Specification of Letters Patent.   Patented Mar. 9, 1915.

Application filed February 25, 1909. Serial No. 479,866.

*To all whom it may concern:*

Be it known that we, FRANK TYSON and WILLIAM G. TYSON, both citizens of the United States, residing in Canton, Ohio, have invented certain Improvements in Thermostatic Heat-Controlling Devices, of which the following is a specification.

The object of our invention is to provide simple and reliable means for effecting thermostatic control of the flow of a heating fluid (hereinafter, for convenience, referred to as "steam") to a pasteurizer or other liquid heating device. For convenience we will hereinafter refer to such device as a "pasteurizer" and to the liquid to be heated as "milk."

In the accompanying drawings—Figure 1 is a top or plan view of that portion of the apparatus to which our invention particularly relates; Fig. 2 is a sectional view, on an enlarged scale, of the thermostatically-operated supplementary valve whereby the operation of the main steam-controlling valve is governed; Fig. 3 is a sectional view, on an enlarged scale, of said main steam-controlling valve, the same being shown in the open position; Fig. 4 is a similar view showing the valve in the closed position; Fig. 5 is a view, partly in vertical section and partly in elevation, of the thermostat; Fig. 6 is a longitudinal section on the line *a—a*, Fig. 1, and Fig. 7 is a sectional view of a modified form of steam-controlling valve.

In the operation of a pasteurizer it is essential, in order to obtain the desired result, that the milk should not be heated much above a pre-determined degree, and that its temperature should not be permitted to fall much below such pre-determined degree, and the readiest means of effecting this object is by proper control of the steam with which the pasteurizer is supplied. Our invention has therefore been devised with the view of providing simple and reliable means whereby the heat of the volume of milk flowing from the pasteurizer is caused to thermostatically govern the flow of steam to said pasteurizer.

The thermostat shown in the drawing comprises a two-part casing 1, 2, the lower part 1 having a deep groove 3, which, at one side of the casing, is divided by a partition 4 whereby the stream of heated milk entering at the inlet 5 is divided, one portion of said stream passing to the right through the groove 3, the other portion passing to the left through said groove, and both streams being united at the outlet 6, from which they are jointly discharged.

Within each half of the groove 3 is located a bent and elastic tube 7, filled with some volatile liquid, each tube being rigidly secured at one end to a stud 9 depending from the cap or cover 2 of the casing, but being free at the opposite end and having said free end connected by a link 10 to a floating lever 11, the points of connection of the links being separated from each other to any desired extent.

By preference, the studs, 9, to which the elastic tubes 7 are secured, are disposed on opposite sides of the casing, whereby the links 10 project in opposite directions from the lever 11, and any movement of the free end of either of the elastic tubes 7 is transmitted to the lever independently of the other but supplements the action thereof, contraction of the tubes caused by a lowering of the temperature serving to move the lever in the direction of the arrow *x*, (Fig. 1) and expansion of the tubes caused by an increase of their temperature moving the lever in the direction of the arrow *y* (Fig. 1), the movement of the lever representing the aggregate of the movement of both tubes.

Mounted in a suitable bearing on the casing 1 is a slide 12, hollow at its outer end and having an internally threaded portion to which is adapted the threaded end of the stem 13 of a duplex valve 15, which coacts with seats formed in a partition 16 separating the inlet and outlet chambers of a valve chest 17, the latter being suitably mounted on the casing 1, as shown in Fig. 1.

With the inlet chamber of this valve chest 17 communicates a pipe 19 of contracted diameter leading from the main steam pipe 20, and from said branch pipe 19 another pipe 21 of contracted diameter leads to a balancing chamber of the main steam-controlling valve 22 hereinafter described.

The lower portion of the valve stem 13 is acted upon by a coiled spring 23, which normally tends to maintain the double valve 15 in the open position, and the area of the ports in the partition 16 of the valve 17 are so proportioned in respect to the area of the steam supply pipe 19 that when the valves 15 are open a free flow through the valve chest 17 of all of the steam supplied by the pipe 19 is provided, and no pressure, or but very little pressure, is maintained in the branch pipe 21.

The main steam-controlling valve chest 22 has an inlet chamber 24 communicating with the main steam pipe 20, and an outlet chamber 25 leading to the pasteurizer and the flow through the valve chest 22 is governed by a valve 26 which is secured to or forms part of a piston 27 free to slide in the upper portion of the chest 22, as shown in Figs. 3 and 4, the lifting or opening movement of the valve being restricted as may be desired by the adjustment of a screw stem 29 adapted to a threaded opening in a cap 30 of the valve.

The valve shown in Figs. 3 and 4 is of the same type as that shown in Letters Patent No. 702,383 granted June 10th, 1902, to William G. Tyson, and it has, in addition to the main valve, 26 a supplementary valve 31 depending therefrom and capable of a certain amount of sliding movement in respect thereto, the flow of the steam around this depending supplementary valve tending constantly to draw the main valve down onto its seat, but this movement, in the absence of any pressure on the top of the valve, being resisted by the upward pressure of the steam upon the latter. If, however, steam under a pressure approximating that in the main steam pipe 20 is admitted to the chamber 32 above the valve 26 a portion of the upward pressure against the underside of said valve is balanced and the action of the steam upon the supplementary valve 31 is then sufficient to draw the main valve against its seat where it will be held as long as the pressure of steam is maintained in the chamber 32 above the valve, but as soon as said pressure is removed the valve 26 will be again lifted and the flow of steam through the valve chest 22 resumed. So long, therefore, as the temperature of the milk flowing through the chamber 3 of the casing of the thermostat is below a certain predetermined degree the elastic tubes 7 will be so contracted that the outer end of the lever 11 will be held free from contact with the inner end of the slide 12, the double valve 15 will be held open, the free escape of steam from the pipe 19, will be permitted, and there will be no such pressure of steam exerted in the chamber 32 of the main valve chest 22 as will cause the main valve therein to be forced against its seat, consequently the free flow of steam will be maintained through the main valve chest 22. As soon, however, as the temperature of the milk flowing through the casing of the thermostat exceeds a predetermined degree, expansion of the elastic tubes 7 will follow and there will be such movement of the lever 11 as will close the double valve 15 and prevent any further escape of steam through the supplementary valve chest 17, consequently steam under pressure will pass through the branch 21 and into the chamber 32 above the main valve 26, and said valve will be closed so as to cut off any further flow of steam through the main valve chest until the temperature of the milk has been so far reduced as to cause contraction of the elastic tubes 7, a release of the slide 12 from the pressure of the lever 11, a re-opening of the double valve 15 and an escape of steam from the chamber 32 of the main valve chest and from the pipe 21, thereby permitting the main valve 26 to again open and permit a flow of steam through the main valve chest.

The adjustment of the valve 26 by means of the manually-operated stem 29 permits the attendant to maintain, through the main valve chest 22, a normal flow of steam in quantity sufficient to heat the milk to the desired temperature, the thermostatic device being intended to prevent overheating of the milk by providing for a temporary cutting off of the flow of steam to the pasteurizer as soon as the temperature of the milk exceeds the predetermined temperature to which it is to be heated.

In Fig. 7 we have illustrated a modified form of main valve which may be used in carrying out our invention, 22ª in this figure representing the main valve chest having an inlet branch 24ª, an outlet branch 25ª, and a valve 26ª, whereby the flow from the inlet to the outlet is governed, this valve having a piston 27ª fitted to a chamber 32ª in the upper portion of the chest, which chamber is in communication with the pipe 21.

Between the piston extension of the valve 26ª and the hand-operated screw stem 29ª is interposed a coiled spring 33 which tends to normally depress the valve 26ª but is without sufficient force to overcome the upward pressure of the steam upon said valve, consequently, when the chamber 32 is without steam pressure therein, the valve will be held open by the steam pressure beneath it, but as soon as the steam is admitted to the chamber 32ª and the pressure of the same is added to that of the spring 33 to project the valve the effect of the combined pressures will be sufficient to thus project the valve, close it against its seat and cut off further flow of the steam through the main chest 22ª, the valve being again opened by the steam pressure thereupon as soon as the pressure of steam is removed from the chamber 32ª.

The spring 33 may be dispensed with, if the area of piston exposed in the chamber 32ª is greater than the area of the valve acted upon by the upward pressure of steam in the main valve chest.

The device described not only constitutes an extremely sensitive thermostatic governing device but it provides for the operation of the main valve by steam derived from the main steam pipe and renders unnecessary the use of any separate and independent supply of fluid under pressure for effecting such operation of the main valve, and to this extent materially simplifies the apparatus as compared with others of its class with which we are familiar.

While we prefer to use in the supplementary valve chest a double valve and double valve seat because of the increased area of passage thereby provided and the limited movement of valve necessary to open or close said passage a single valve can, if desired, be employed, and other modifications of detail may be resorted to within the scope of our invention.

We claim:—

1. Thermostatic apparatus in which are combined a thermostat comprising a casing having therein a pair of elastic members, each secured to the casing at one end and free at the other, the fixed end of one member being adjacent to the free end of the other, a lever joined to the free ends of the elastic members by separated connections, one extending in one direction from the lever and the other extending in the opposite direction therefrom, a controlling valve for the heating fluid, and a slide connected to the stem of said valve and being acted upon by said lever.

2. Thermostatic apparatus in which are combined a thermostat comprising a casing having a groove therein and a partition whereby the flow through said groove is directed partly to the right and partly to the left, an elastic member in each part of the groove, a lever connected to each of said elastic members and operated by the expansion or contraction of the same, a controlling valve for the heating fluid, and a slide connected to the stem of said valve and being acted upon by said lever.

In testimony whereof, we have signed our names to this specification, in the presence of two subscribing witnesses.

FRANK TYSON.
WILLIAM G. TYSON.

Witnesses:
H. B. STEWART,
W. F. HAY.